US007303619B2

(12) United States Patent
Oyanagi

(10) Patent No.: US 7,303,619 B2
(45) Date of Patent: Dec. 4, 2007

(54) COMPOSITE PIGMENT ORIGINAL, COMPOSITE PIGMENT, PROCESS FOR PRODUCING INK COMPOSITION, AND INK COMPOSITION

(75) Inventor: Takashi Oyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 441 days.

(21) Appl. No.: 10/924,341

(22) Filed: Aug. 23, 2004

(65) Prior Publication Data
US 2005/0090581 A1    Apr. 28, 2005

(30) Foreign Application Priority Data
Aug. 21, 2003 (JP) ............... P.2003-297887
Aug. 21, 2003 (JP) ............... P.2003-297890
Aug. 21, 2003 (JP) ............... P.2003-297894

(51) Int. Cl.
*C09D 11/02* (2006.01)
(52) U.S. Cl. ............... 106/31.6; 106/415; 106/431
(58) Field of Classification Search ........... 106/31.6, 106/415, 431
See application file for complete search history.

(56) References Cited

U.S. PATENT DOCUMENTS

| 5,498,781 | A  | * | 3/1996  | Hall et al. ............... 523/213 |
| 6,241,811 | B1 | * | 6/2001  | Sano ................. 106/31.85 |
| 6,517,628 | B1 | * | 2/2003  | Pfaff et al. .............. 106/417 |
| 6,533,857 | B1 | * | 3/2003  | Schmid et al. ............ 106/403 |
| 6,692,561 | B1 | * | 2/2004  | Schoen et al. ............ 106/439 |
| 6,719,838 | B2 | * | 4/2004  | Heider et al. ............ 106/417 |
| 6,767,633 | B2 | * | 7/2004  | Steudel et al. ........... 428/357 |
| 6,884,289 | B2 | * | 4/2005  | Schoen et al. ............ 106/415 |
| 2002/0104461 | A1 | * | 8/2002 | Schmidt et al. ........... 106/417 |
| 2003/0205170 | A1 | * | 11/2003 | Schmidt et al. ........... 106/415 |
| 2006/0225609 | A1 | * | 10/2006 | Rueger et al. ............ 106/31.9 |

FOREIGN PATENT DOCUMENTS

| JP | 07-295475  | 11/1995 |
| JP | 11-323182  | 11/1999 |
| JP | 11-323223  | 11/1999 |
| JP | 11-343436  | 12/1999 |
| JP | 11-349847  | 12/1999 |
| JP | 2000-017208 | 1/2000 |
| JP | 2001-026801 | 1/2001 |
| JP | 2001-355008 | 12/2001 |
| JP | 2002-003902 | 1/2002 |
| JP | 2002-004031 | 1/2002 |
| JP | 2003-113327 | 4/2003 |

OTHER PUBLICATIONS

Patent Abstracts of Japan of JP 2003-113327 dated Apr. 18, 2003 and JPO English Computer-Generated Translation.
Patent Abstracts of Japan of JP 11-323182 dated Nov. 26, 1999 and JPO English Computer-Generated Translation.
Patent Abstracts of Japan of JP 11-323223 dated Nov. 26, 1999 and JPO English Computer-Generated Translation.
Patent Abstracts of Japan of JP 11-343436 dated Dec. 14, 1999 and JPO English Computer-Generated Translation.
Patent Abstracts of Japan of JP 11-349847 dated Dec. 21, 1999 and JPO English Computer-Generated Translation.
Patent Abstracts of Japan of JP 2000-017208 dated Jan. 18, 2000 and JPO English Computer-Generated Translation.
Patent Abstracts of Japan of JP 2001-026801 dated Jan. 30, 2001 and JPO English Computer-Generated Translation.
Patent Abstracts of Japan of JP 2001-355008 dated Dec. 25, 2001 and JPO English Computer-Generated Translation.
Patent Abstracts of Japan of JP 2002-003902 dated Jan. 9, 2002 and JPO English Computer- Generated Translation.
Patent Abstract of Japan of JP 2002-004031 dated Jan. 9, 2002 and JPO English Computer- Generated Translation.
Patent Abstract of Japan of JP 07-295475 dated Nov. 10, 1995 and JPO English Computer-Generated Translation.

* cited by examiner

*Primary Examiner*—J. A. Lorengo
*Assistant Examiner*—Veronica Faison-Gee
(74) *Attorney, Agent, or Firm*—Ladas and Parry LLP

(57) ABSTRACT

The present invention provides a composite pigment original having a structure comprising a resin layer and a pigment layer sequentially stacked on a sheet-shaped substrate surface, the pigment layer having a structure that at least a silicon oxide layer, a metal or metal compound layer and a silicon oxide layer are sequentially stacked. Furthermore, a composite pigment obtained from the composite pigment original, a process for producing an ink composition using the composite pigment original, and an ink composition obtained by the production process are disclosed.

31 Claims, No Drawings

COMPOSITE PIGMENT ORIGINAL, COMPOSITE PIGMENT, PROCESS FOR PRODUCING INK COMPOSITION, AND INK COMPOSITION

FIELD OF THE INVENTION

The present invention relates to a composite pigment original and a composite pigment. More specifically, the present invention relates to a composite pigment original and a composite pigment, which are used for an ink-jet recording ink and excellent in the storage stability and dispersibility.

The present invention further relates to a process for producing an ink composition using the composite pigment original, and an ink composition obtained by the production process. More specifically, the present invention relates to a process capable of efficiently producing an ink composition for use in an inkjet recording ink, which has a metallic luster and is excellent in the storage stability and dispersibility, and an ink composition produced by the process.

BACKGROUND OF THE INVENTION

The inkjet recording method is a method of ejecting an ink droplet from a fine nozzle head and recording a letter or a figure on the surface of a recording medium such as paper. The inkjet recording method practically used includes a method of converting electrical signals into mechanical signals by using an electrostrictive element and intermittently ejecting an ink droplet stored in the nozzle head section, thereby recording a letter or a symbol on the recording medium surface, and a method of generating a bubble by abruptly heating a part of the ink solution in a partial portion close to the ejection portion of a nozzle head and intermittently ejecting an ink droplet as a result of volume expansion generated by the bubble, thereby recording a letter or a symbol on the recording medium surface.

As for the inkjet recording ink, an aqueous pigment ink obtained by dispersing a pigment in water has been recently provided, because an ink using a pigment can give a printed image excellent in water resistance or light fastness as compared with an ink using a water-soluble dye. In such an aqueous pigment ink, a pigment is generally dispersed in an aqueous dispersion medium by using a dispersant such as surfactant or polymer dispersant. However, the dispersant merely adsorbed to the pigment surface sometimes deteriorates the dispersed state by repeating desorption and adsorption.

For the purpose of enhancing the dispersibility of pigment contained in the inkjet recording ink, a technique of using a microencapsulated pigment obtained by covering a colorant particle with a polymer is known. For example, there are disclosed a microencapsulated colorant dispersion and an aqueous ink composition, comprising a micro-encapsulated colorant obtained by dispersing a water-insoluble colorant in the presence of a vinyl-based polymerizable dispersant and a polymer azo initiator containing a specific repeating unit under the conditions of not causing activation of the polymer azo initiator, and then activating the polymer azo initiator in the obtained dispersion to polymerize the vinyl-based polymerizable dispersant (see, for example, Patent Document 1).

In the inkjet recording ink, a metal powder having a metallic luster (hereinafter sometimes simply referred to as a "metal powder"), such as aluminum, and if desired, a pigment comprising a coloring material for imparting other arbitrary color tone (hereinafter sometimes-referred to as a "metallic pigment") are sometimes used.

However, metal powder and the like easily available on the market are low in the luster due to surface non-uniformity originated in the production process or because of their high reactivity, restricted in view of use, for example, the metal powder and the like must be stored in an inert gas atmosphere away from contact with water or the like. Furthermore, the reactivity with moisture in air is also high and this gives rise to a problem in the storability, for example, the quality deteriorates during a long-term storage due to generation of hydrogen or gelling. In addition, the metal powder is not easily blended with a coloring material for imparting an arbitrary color tone, and desired coloration is difficult to attain.

The highly active metal powder such as aluminum readily reacts with water in an aqueous solvent and can be hardly applied to an ink using an aqueous solvent, because problems arise during storage, such as generation of hydrogen or gelling. The metal powder has been heretofore usually used for a non-aqueous solvent-type ink.

Furthermore, in the case of storing a conventional metallic pigment or an ink, coating material or the like containing the metallic pigment, these cannot be stored for a long time because of problems of reactivity with water and surface oxidation.

In addition, the metal powder for use in conventional metallic pigments usually has a particle size as large as 20 to 30 μm and cannot be used as it is for the inkjet ink. Not only the particle size but also the specific gravity is large and therefore, the metal powder is bad in the dispersion stability and readily precipitates. The dispersion stability cannot be satisfactorily improved even by using the above-described microencapsulation technique.

On the other hand, in order to impart metallic luster/brightness decoration or the like to an image obtained by the inkjet ink, an inkjet ink containing flakes of a laminated body having a metallized layer and a resin layer is disclosed (see, for example, Patent Document 2). However, the technique of Patent Document 2 cannot overcome the problem regarding reactivity with water.

Patent Document 1: JP 2003-113327 A
Patent Document 2: JP 11-343436 A

SUMMARY OF THE INVENTION

Accordingly, an object of the present invention is to solve those problems and provide a metallic composite pigment original using a metal or a metal compound, which is excellent in the storage stability and free from the problem of reactivity with water.

Another object of the present invention is to provide a metallic composite pigment capable of, when used as an aqueous inkjet ink composition, maintaining dispersion stability in an aqueous system and giving recorded matter having high printing quality and excellent storage stability and also excellent in water resistance, light fastness and glossiness.

A still other object of the present invention is to provide a process capable of easily producing an ink composition having a metallic luster by the use of a metal or a metal compound and being excellent in the storage stability and free from the problem of reactivity with water, which can maintain the dispersion stability in an aqueous system and give recorded matter having high printing quality and excellent storage stability and also excellent in water resistance, light fastness and glossiness of the printed image obtained.

A still other object of the present invention is to provide an ink composition produced by this process.

Other objects and effects of the invention will become apparent from the following description.

The present inventors have found that the metal powder used in a metallic pigment is highly reactive and has a problem in the storability and reactivity with water but when constituted as a composite pigment having a stacked structure of silicon oxide layer/metal or metal compound layer/silicon oxide layer, chemical stability is attained, reaction with water is prevented, the long-term storability is remarkably enhanced and furthermore, excellent quality as an aqueous inkjet ink composition is obtained; when constituted as a composite pigment having a stacked structure of silicon oxide layer/coloring material layer/metal or metal compound layer/coloring material layer/silicon oxide layer, arbitrary coloration is also facilitated; and when a stacked part of a resin layer and a sheet-shaped substrate is employed for the above-described stacked structure, the stacked structure body is easily separated and pulverized in an aqueous liquid. The present invention has been accomplished based on these findings.

That is, the present invention relates to the following composite pigment original and composite pigment.

(1) A composite pigment original having a structure comprising a resin layer and a pigment layer sequentially stacked on a sheet-shaped substrate surface, the pigment layer having a structure that at least a silicon oxide layer, a metal or metal compound layer and a silicon oxide layer are sequentially stacked.

(2) The composite pigment original as described in (1) above, wherein the thickness of the pigment layer is from 100 to 500 nm.

(3) The composite pigment original as described in (1) above, wherein the resin layer comprises a polyvinyl alcohol, a polyethylene glycol, a polyacrylic acid, a polyacrylamide or a cellulose derivative.

(4) The composite pigment original as described in (1) above, wherein the silicon oxide layer is formed of a silicon alkoxide or a polymer thereof by a sol-gel method.

(5) The composite pigment original as described in (1) above, wherein the metal or metal compound layer is formed by vacuum deposition, ion plating or sputtering.

(6) The composite pigment original as described in (1) above, wherein the sheet-shaped substrate is a polyethylene terephthalate or a copolymer thereof.

(7) The composite pigment original as described in (1) above, which has a plurality of the sequentially stacked structures of the resin layer and the pigment layer.

(8) The composite pigment original as described in (7) above, wherein the stacked structure of the plural pigment layers has an entire thickness of 5,000 nm or less.

(9) A composite pigment obtained by separating the pigment layer of the composite pigment original described in (1) above, at the resin layer as a boundary, from the sheet-shaped substrate and pulverizing the separated pigment layer.

(10) The composite pigment as described in (9) above, wherein the separation is performed by immersing the composite pigment original in a liquid.

(11) The composite pigment as described in (9) above, wherein the pulverization is performed by an ultrasonic treatment.

(12) The composite pigment as described in (10) above, wherein the pulverization is performed by an ultrasonic treatment.

(13) The composite pigment as described in (10) above, wherein the liquid is an aqueous system.

(14) The composite pigment as described in (12) above, wherein the liquid is an aqueous system.

According to the present invention, a composite pigment original using a metal or metal compound and being excellent in storage stability and free from reactivity with water, which cannot be obtained by conventional techniques, can be obtained.

More specifically, the composite pigment original of the present invention has a stacked structure body where the metal or metal compound layer is surrounded by silicon oxide layers, and therefore, is reduced in the influence with respect to oxygen and water.

When the composite pigment original of the present invention is treated, for example, with an ultrasonic wave while immersing it in a liquid, a composite pigment having an average particle size of about 3 µm can be obtained.

Also, since the silicon oxide has a small specific gravity and the polyvinyl alcohol or the like in the resin layer serves as a protective colloid, there can be provided a composite pigment capable of, as an aqueous inkjet ink composition, enhancing the dispersion stability in an aqueous system, ensuring good adhesion to a recording medium (e.g., paper), and giving recorded matter having high printing quality, excellent storage stability and quick drying property and also excellent in the water resistance, light fastness and glossiness.

In addition, when the composite pigment original of the present invention is stored in a roll form, the contact with oxygen and moisture in air can be more reduced and this enables a long-term storage over 1 year, which is difficult in conventional metal pigments.

Furthermore, the composite pigment original and composite pigment of the present invention may be a composite pigment original and a composite pigment having the following constitutions where a coloring material layer for imparting an arbitrary color tone is provided-between the metal or metal compound layer and respective silicon oxide layer.

(15) The composite pigment original as described in any one of (1) to (8) above, wherein the pigment layer has a structure that a silicon oxide layer, a coloring material layer, a metal or metal oxide layer, a coloring material layer and a silicon oxide layer are sequentially stacked.

(16) The composite pigment original as described in (15) above, wherein the silicon oxide layer or coloring material layer is formed by coating.

(17) The composite pigment as described in any one of (9) to (14) above, wherein the pigment layer has a structure that a silicon oxide layer, a coloring material layer, a metal or metal oxide layer, a coloring material layer and a silicon oxide layer are sequentially stacked.

(18) The composite pigment as described in (17) above, wherein the silicon oxide layer or coloring material layer is formed by coating.

According to the embodiments of (15) to (18) above of the present invention, arbitrary coloration is facilitated.

The present invention also relates to a process for producing an ink composition using the composite pigment original, and an ink composition obtained by the production process.

(19) A process for producing an ink composition, comprising treating the composite pigment original described in (1) above with an ultrasonic wave in an aqueous dispersion medium for ink.

(20) The process for producing an ink composition as described in (19) above, wherein the thickness of the pigment layer is from 100 to 500 nm.

(21) The process for producing an ink composition as described in (19) above, wherein the resin layer comprises a polyvinyl alcohol, a polyethylene glycol, a polyacrylic acid, a polyacrylamide or a cellulose derivative.

(22) The process for producing an ink composition as described in (19) above, wherein the silicon oxide layer is formed of a silicon alkoxide or a polymer thereof by a sol-gel method.

(23) The process for producing an ink composition as described in (19) above, wherein the metal or metal compound layer is formed by vacuum deposition, ion plating or sputtering.

(24) The process for producing an ink composition as described in (19) above, wherein the sheet-shaped substrate is a polyethylene terephthalate or a copolymer thereof.

(25) The process for producing an ink composition as described in (19) above, wherein the composite pigment original has a plurality of the sequentially stacked structures of the resin layer and the pigment layer.

(26) The process for producing an ink composition as described in (25) above, wherein the stacked structure of the plural pigment layers has an entire thickness of 5,000 nm or less.

(27) The process for producing an ink composition as described in (19) above, wherein a coloring material layer is provided between the silicon oxide layer and the metal or metal compound layer.

(28) The process for producing an ink composition as described in (19) above, wherein the silicon oxide layer or coloring material layer is formed by coating.

(29) An ink composition produced by the production process described in (19) above.

(30) The ink composition as described in (29) above, which further contains a polyhydric alcohol lower alkyl ether and/or an acetylene glycol-based surfactant represented by the following formula (I):

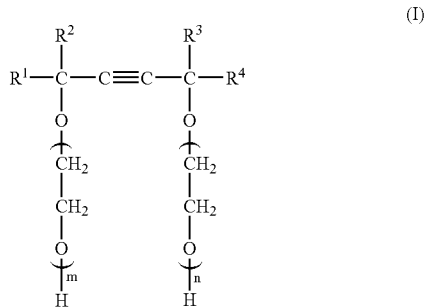

wherein $0 \leq m+n \leq 30$, and $R^1$ to $R^4$ each is independently a $C_{1-6}$ alkyl group.

(31) The ink composition as described in (29) above, which further contains a 1,2-alkanediol and/or a polyether-modified organosiloxane-based surfactant represented by the following formula (II):

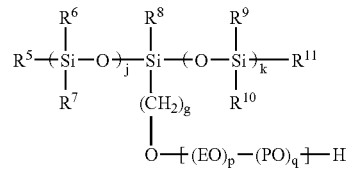

wherein $R^5$ to $R^{11}$ each is independently a $C_{1-6}$ alkyl group, j, k and g each is independently an integer of 1 or more, EO is an ethyleneoxy group, PO is a propyleneoxy group, p and q each is an integer of 0 or more, provided that p+q is an integer of 1 or more, EO and PO are not limited in their order within the square brackets and may be randomly present or may form a block.

According to the present invention, an ink composition using a metal or metal compound to give a metallic luster and being excellent in the storage stability and free from the problem of reactivity with water, which cannot be obtained in conventional techniques, can be easily obtained.

More specifically, the process for producing an ink composition of the present invention uses a stacked structure body where the metal or metal compound layer is surrounded by silicon oxide layers, and therefore, the obtained ink composition is reduced in the influence with respect to oxygen and water.

Also, according to the process for producing an ink composition of the present invention, a composite pigment having an average particle size of about 3 μm can be obtained.

In addition, according to the process for producing an ink composition of the present invention, since the silicon oxide of the composite pigment original used has a small specific gravity and the polyvinyl alcohol or the like in the resin layer serves as a protective colloid, the dispersion stability of the pigment component in an aqueous system can be enhanced, and the ink composition obtained can show good adhesion to a recording medium (e.g., paper). Therefore, recorded matter having high printing quality, excellent storage stability and quick drying property and also excellent in the water resistance, light fastness and glossiness can be obtained.

DETAILED DESCRIPTION OF THE INVENTION

The composite pigment original and composite pigment of the present invention are described in detail below.

The composite pigment original of the present invention comprises a structure that a resin layer and a pigment layer are sequentially stacked on one surface or both surfaces of a sheet-shaped substrate. The pigment layer has a structure that a silicon oxide layer, a metal or metal compound layer and a silicon oxide layer are sequentially stacked, or a structure that a silicon oxide layer, a coloring material layer, a metal or metal compound layer, a coloring material layer and a silicon oxide layer are sequentially stacked. The composite pigment of the present invention is a pigment obtained by separating the pigment layer of the composite pigment original, at the resin layer as a boundary, from the sheet-shaped substrate and pulverizing the separated pigment layer.

That is, the composite pigment of the present invention comprises a metal or metal compound powder but in order to improve the defects, particularly, storability of conventional metallic pigments and also impart excellent suitability, particularly, dispersion stability as an aqueous inkjet ink composition, the composite pigment of the present invention is characterized in that the pigment layer has a stacked plate-like structure where a silicon oxide layer/a metal or metal compound layer/a silicon oxide layer are sequentially stacked, or for further imparting arbitrary coloring property, a stacked plate-like structure where a silicon oxide layer/a coloring material layer/a metal or metal compound layer/a coloring material layer/a silicon oxide layer are sequentially stacked.

The constituent components of each layer constituting the composite pigment original and composite pigment of the present invention, the method for forming the layers, the processing method and the like are described below.

Pigment Layer

The pigment layer in the stacked plate-like structure of the composite pigment original of the present invention is described below.

The pigment layer has a structure that at least a silicon oxide layer, a metal or metal compound layer and a silicon oxide layer are sequentially stacked.

The thickness of the pigment layer is preferably from 100 to 500 nm. If the thickness is less than 100 nm, the mechanical strength is insufficient, whereas if it exceeds 500 nm, the strength is too high and pulverization and dispersion becomes difficult.

The metal or metal compound layer in the pigment layer is not particularly limited as long as it has a function such as having metallic luster, but examples thereof include aluminum, silver, gold, nickel, chromium, tin, zinc, indium and titanium. At least one of these simple metals, metal compounds, and alloys or mixtures thereof is used.

The metal or metal compound layer is preferably formed by vacuum deposition, ion plating or sputtering. The thickness of the metal or metal compound layer is not particularly limited but is preferably from 30 to 150 nm. If the thickness is less than 30 nm, the reflectivity or brightness is poor and the performance as a metal pigment decreases, whereas if it exceeds 150 nm, the apparent specific gravity increases and the dispersion stability of the composite pigment decreases. An unnecessary increase in the thickness of the metal or metal compound layer incurs the increase of weight of a particle and even if the thickness is larger than the above-described range, the reflectivity and brightness are not so changed.

The silicon oxide layer in the pigment layer is not particularly limited as long as it is a layer containing a silicon oxide, but the silicon oxide layer is preferably formed of a silicon alkoxide or a polymer thereof by a sol-gel method.

An alcohol solution having dissolved therein the silicon alkoxide or a polymer thereof is coated and baked under heating, whereby the silicon oxide layer coating is formed.

The coating of the silicon oxide layer is performed by a method generally used, such as gravure coating, roll coating, blade coating, extrusion coating, dip coating and spin coating. After the coating and drying, if desired, the surface is smoothed by calendering.

The thickness of the silicon oxide layer is not particularly limited but is preferably from 50 to 150 nm. If the thickness is less than 50 nm, the mechanical strength is insufficient, whereas if it exceeds 150 nm, the strength is too high and pulverization and dispersion becomes difficult.

In order to obtain an ink composition having a desired color tone or color hue, a coloring material layer may be provided between the silicon oxide layer and the metal or metal compound layer.

The coloring material layer in the pigment layer is not particularly limited as long as it contains a coloring material capable of imparting an arbitrary color tone or color hue in addition to the metallic luster and brightness of the composite pigment of the present invention. The coloring material for use in the coloring material layer may be either a dye or a pigment. A known dye or pigment can be appropriately used.

In this case, the "pigment" used in the coloring material layer means a natural pigment, a synthetic organic pigment, a synthetic inorganic pigment or the like as defined in the field of general pigment chemistry, and differs from those processed into a stacked structure like the "composite pigment" of the present invention.

The coloring material layer is not particularly limited in its formation method but is preferably formed by coating.

When the composite pigment original for use in the production process of the present invention has the coloring material layer, it is preferred in view of operational efficiency in the production to form both the silicon oxide layer and the coloring material layer by coating.

Resin Layer

The resin layer in the composite pigment original of the present invention, which is an undercoat layer of the pigment layer, is a releasable layer for enhancing the releasability from the sheet-shaped substrate. Accordingly, the resin is not particularly limited as long as it is a water-soluble resin, but preferred examples thereof include a polyvinyl alcohol, a polyethylene glycol, a polyacrylic acid, a polyacrylamide and a cellulose derivative.

An aqueous solution containing one or a mixture of two or more of these hydrophilic resins is coated and then subjected to drying or the like, whereby the resin layer is formed. In the coating solution, additives such as viscosity adjusting agent can be contained.

Coating of the resin layer is performed in the same manner as the coating of the silicon oxide layer.

The thickness of the resin layer is not particularly limited but is preferably from 0.5 to 50 μm, more preferably from 1 to 10 μm. If the thickness is less than 0.5 μm, the amount as the dispersion resin is insufficient, whereas if it exceeds 50 μm, when the composite pigment original is formed into a roll, the resin layer is readily separated at the interface with the silicon oxide layer.

The composite pigment original of the present invention may also have a layer structure having a plurality of the sequentially stacked structures of the resin layer and the pigment layer. At this time, the entire thickness of the stacked structure of the plural pigment layers, that is, the thickness of pigment layer-resin layer-pigment layer . . . resin layer-pigment layer excluding the sheet-shaped substrate and the resin layer just above the substrate, is preferably 5,000 nm or less. When this thickness is 5,000 nm or less, even when the composite pigment original is rolled up, pulverization or separation is hardly generated and excellent storability is obtained. Also, the pigment obtained can have excellent brightness and this is preferred.

The composite pigment original of the present invention may also have a structure that a resin layer and a pigment layer are sequentially stacked on both surfaces of the sheet-shaped substrate, but the present invention is not limited to these structures.

Sheet-Shaped Substrate

The sheet-shaped substrate for use in the composite pigment original is not particularly limited, but examples thereof include releasable film such as polyester film (e.g., polytetrafluoroethylene, polyethylene, polypropylene, polyethylene terephthalate, polyethylene naphthalate), polyamide film (e.g., 66 nylon, 6 nylon), polycarbonate film, triacetate film and polyimide film.

The sheet-shaped substrate is preferably a polyethylene terephthalate or a copolymer thereof.

The thickness of the sheet-shaped substrate is not particularly limited but is preferably from 10 to 150 μm. When the thickness is 10 μm or more, the handleability in the process or the like has no problem and when the thickness is 150 μm or less, the substrate can be flexible and causes no problem such as separation when formed into a roll.

Separation of Composite Pigment

The composite pigment of the present invention can be obtained by separating the pigment layer of the composite pigment original, at the resin layer as a boundary, from the sheet-shaped substrate, and subjecting the separated pigment layer to size-reduction by pulverization.

The method for separating the composite pigment is not particularly limited, but a method of performing the separation by immersing the composite pigment original in a liquid, and a method of simultaneously performing the immersing in a liquid and an ultrasonic treatment to effect separation and pulverization of the separated composite pigment are preferred. The liquid is preferably an aqueous system.

The composite pigment of the present invention can be used also in an aqueous solvent because the metal or metal compound layer is protected by a silicon oxide layer. Furthermore, the resin layer plays the roll of protective colloid and therefore, a stable aqueous dispersion can be obtained only by dispersing the composite pigment in water. In the case of using the composite pigment of the present invention for an ink composition, the resin layer also undertakes a function of giving the ink composition an adhesive property to a recording medium such as paper.

Production Process of Ink Composition

The production process of an ink composition and the ink composition of the present invention are described in detail below.

The production process of an ink composition of the present invention comprises treating the above-described composite pigment original with an ultrasonic wave in an aqueous dispersion medium for ink, thereby carrying out separation of the pigment layer of the composite pigment original, at the resin layer as a boundary, from the sheet-shaped substrate and pulverization.

The composite pigment separated from the sheet-shaped substrate, pulverized and dispersed in the ink composition has no reactivity with water, because the metal pigment layer is protected by the silicon oxide layer. Also, the resin layer plays the roll of protective colloid and therefore, a stable aqueous ink composition can be obtained. Furthermore, by virtue of the resin layer, the ink composition obtained by the production process of the present invention is enhanced in the adhesive property to a recording medium such as paper.

Aqueous Dispersion Medium for Ink

The aqueous dispersion medium for ink used in the production process of an ink composition of the present invention is not particularly limited as long as it is an aqueous liquid solvent.

It may be possible to use water as a dispersion medium in the step of immersing the pigment original and treating it with ultrasonic wave and after the composite pigment is dispersed, add other components necessary as an ink composition, or to prepare an aqueous dispersion medium for ink by previously adding other components necessary as an ink composition, immerse the pigment original therein, treat it with ultrasonic wave, thoroughly disperse the composite pigment, and use the resulting dispersion as it is as an ink composition.

The amount of the composite pigment dispersed in the ink composition obtained by the production process of the present invention is preferably from 0.5 to 30 wt %, more preferably from 1 to 15 wt %, based on the weight of the ink composition (for example, ink composition for ink-jet recording). When the amount of the composite pigment dispersed is 1 wt % or more, a sufficiently high printing density can be ensured and when the amount is 15 wt % or less, the ink composition can be prevented from increase in the viscosity or deterioration of the ejection stability.

The aqueous dispersion medium for ink used in the present invention comprises, as the basic solvent, water and a water-soluble organic solvent and may contain, if desired, other arbitrary components.

The aqueous dispersion medium for ink used in the present invention may contain a water-soluble organic solvent. Specific examples thereof include alkyl alcohols having from 1 to 4 carbon atoms, such as ethanol, methanol, butanol, propanol and isopropanol, glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether, formamide, acetamide, dimethylsulfoxide, sorbitol, sorbitan, acetin, triacetin and sulfolane.

Among these water-soluble organic solvents, water-soluble organic solvents having a boiling point of 180° C. or more are preferred. When a water-soluble organic solvent having a boiling point of 180° C. or more is used, this can impart water retentivity and wettability, as a result, an ink composition capable of maintaining flowability and redispersibility for a long time even when left standing in an open state (state in contact with air at room temperature) can be provided. Furthermore, clogging of a nozzle is scarcely generated during printing or at the restart after a break of printing, and high ejection stability can be obtained.

Specific examples of the water-soluble organic solvent having a boiling point of 180° C. or more include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, 1-methyl-2-pyrrolidone, 1,3-dimethyl-2-imidazolidinone, 2-pyrrolidone, glycerin, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monoethyl ether, diethylene glycol monomethyl ether, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerin, mesoerythritol, pentaerythritol. An organic solvent having a boiling point of 200° C. or more is more preferred. These organic solvents can be used individually or as a mixture of two or more thereof.

The content of the water-soluble organic solvent is preferably from 10 to 50 wt %, more preferably from 10 to 30 wt %, based on the weight of the entire ink composition.

Other components contained, if desired, in the aqueous dispersion medium for ink used in the present invention are not particularly limited, but in a preferred embodiment, a penetrant is preferably contained. The penetrant enhances the penetrability into a recording medium (e.g., paper).

Preferred examples of the penetrant include polyhydric alcohol lower alkyl ethers (glycol ethers) and/or acetylene glycol-based surfactants represented by the following formula (I):

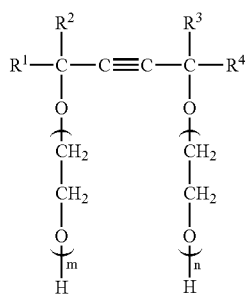

wherein $0 \leq m+n \leq 30$, and $R^1$ to $R^4$ each is independently a $C_{1-6}$ alkyl group.

The amount of the polyhydric alcohol lower alkyl ether added is preferably from 7 to 12 wt %, more preferably from 7 to 10 wt %.

Among the acetylene glycol-based surfactants represented by formula (I), specific preferred examples are shown in the Table below. In the Table below, most preferred is an acetylene glycol-based surfactant of No. 1.

| No. | $R^1$ | $R^2$ | $R^3$ | $R^4$ | m + n |
|---|---|---|---|---|---|
| 1 | iso-butyl | methyl | methyl | iso-butyl | 10 |
| 2 | iso-butyl | methyl | methyl | iso-butyl | 3.5 |
| 3 | ethyl | methyl | methyl | ethyl | 10 |
| 4 | methyl | methyl | methyl | methyl | 0 |
| 5 | ethyl | methyl | methyl | ethyl | 0 |
| 6 | iso-butyl | methyl | methyl | iso-butyl | 0 |

The acetylene glycol-based surfactant represented by formula (I) may be a commercially available product and specific examples thereof include Surfynol 104, 82, 465, 485, Tg (all are available from Air Product and Chemicals, Inc.), Olfin STG and Olfin E1010 (trade name, these are produced by Nisshin Chemical).

The amount of the acetylene glycol-based surfactant added may be appropriately selected but is preferably from 0.5 to 1.2 wt %, more preferably from 0.5 to 1 wt %, based on the ink composition.

Other preferred examples of the penetrant include 1,2-alkanediols and/or polyether-modified organosiloxane-based compounds represented by the following formula (II):

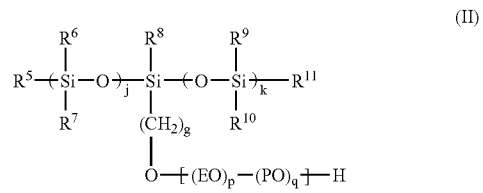

wherein $R^5$ to $R^{11}$ each is independently a $C_{1-6}$ alkyl group, j, k and g each is independently an integer of 1 or more, EO is an ethyleneoxy group, PO is a propyleneoxy group, p and q each is an integer of 0 or more, provided that p+q is an integer of 1 or more, EO and PO are not limited in their order within the square brackets and may be randomly present or may form a block.

Examples of the 1,2-alkane diol include those having from 4 to 6 carbon atoms, such as 1,2-butanediol, 1,2-pentanediol and 1,2-hexanediol. Among these, preferred are 1,2-pentanediol and 1,2-hexanediol, and more preferred is 1,2-hexanediol. These may be used individually or in combination of two or more thereof.

The amount of the 1,2-alkanediol added is preferably on the order of 3 to 20 wt %, more preferably on the order of 4 to 18 wt %, still more preferably on the order of 5 to 15 wt %, based on the ink composition.

The polyether-modified organosiloxane-based compound represented by formula (II) is preferably a compound where $R^5$ to $R^{11}$ each is independently an alkyl group having from 1 to 6 carbon atoms, preferably a methyl group, j, k and g each is independently an integer of 1 or more, preferably an integer of 1 to 2, and p and q each is an integer of 0 or more, provided that p+q is an integer of 1 or more.

The polyether-modified organosiloxane-based compound represented by formula (II) is more preferably, for example, a compound where j=k+1 is satisfied, or a compound where $R^5$ to $R^{11}$ all are a methyl group, j is 2, k is 1, g is 1, p is an integer of 1 or more, and q is 0.

The compound represented by formula (II) is available on the market and those commercially available products can be used. For example, silicon-containing surfactants BYK-345, BYK-346, BYK-347 and BYK-348 available on the market from Byk-Chemie Japan can be used.

The amount of the polyether-modified organosiloxane-based compound added may be appropriately selected but is preferably on the order of 0.03 to 3 wt %, more preferably on the order of 0.1 to 2 wt %, still more preferably on the order of 0.3 to 1 wt %, based on the ink composition.

Other Ink Components

Other than these, the ink composition of the present invention may contain a wetting agent, a clogging inhibitor, an antiseptic, an antioxidant, an electric conductivity adjusting agent, a pH adjusting agent, a viscosity adjusting agent, a surface tension adjusting agent, an oxygen absorbent and the like.

Examples of the wetting agent include glycerin, ethylene glycol, diethylene glycol, triethylene glycol, tetraethylene glycol, propylene glycol, dipropylene glycol, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, mesoerythritol and pentaerythritol, with glycerin being preferred.

The amount of the wetting agent added may be appropriately selected but is preferably on the order of 0.5 to 40 wt %, more preferably on the order of 1.5 to 6 wt %, based on the ink composition.

Examples of the pH adjusting agent include potassium hydroxide, sodium hydroxide and triethanolamine.

EXAMPLES

The present invention will be illustrated in greater detail with reference to the following Examples and Comparative Examples, but the invention should not be construed as being limited thereto.

Example 1

Preparation of Substrate Sheet

On a 100 μm-thick PET film, a coating solution having the following composition was coated by spin coating and dried to form a resin layer.

Coating Solution for Resin Layer:

| | |
|---|---|
| PVA (polyvinyl alcohol, average molecular weight: 10,000, saponification degree: 80%) | 3.3 wt % |
| Glycerin | 1.7 wt % |
| Ion exchanged water | balance |

Resin Layer Coating Conditions:

Coating conditions: Rotated at 500 rpm for 5 seconds and then rotated at 2,000 rpm for 30 seconds.

Drying conditions: 100° C., 5 minutes.

The thickness of the resin layer formed under these conditions was 10 μm.

Formation of Silicon Oxide Layer

On the thus-processed PET film, a coating solution having the following composition was coated by spin coating and baked to form a silicon oxide layer.

Coating Solution for Silicon Oxide Layer:

| | |
|---|---|
| HAS-6 (produced by Colcoat Co., Ltd.) | 10 wt % |
| Ethanol | 42.5 wt % |
| 2-Ethoxyethanol | 47.5 wt % |

Silicon Oxide Layer Coating Conditions:

Coating conditions: Rotated at 500 rpm for 5 seconds and then rotated at 2,000 rpm for 30 seconds.

Baking conditions: 140° C., 5 minutes.

The thickness of the silicon oxide layer formed under these conditions was 70 nm.

Formation of Aluminum Layer

On the silicon oxide layer, an aluminum vapor-deposited layer having a thickness of 70 nm was formed by using the following apparatus.

Apparatus: vacuum depositing apparatus Model VE-1010 manufactured by Shinkuu Device K.K.

Formation of Silicon Oxide Layer

On the aluminum layer, a silicon oxide layer was formed in the same manner as above. The thickness of the silicon oxide layer formed was 70 nm.

Evaluation of Storage Stability

In order to examine the storability of the PET film (pigment original) having thereon a stacked body of silicon oxide-aluminum-silicon oxide formed above, the pigment original was wound around a paper tube having a diameter of 4 inches and left standing for 1 year in an air in the environment of normal temperature and atmospheric pressure. As a result, even after the passing of 1 year, the pigment original was free from reduction in the surface luster or the like due to oxidation corrosion. Furthermore, when a coating solution was prepared through the following pigment formation step by using this pigment original left standing, the coating film obtained by dropping the coating solution on a PM/MC photographic paper sheet exhibited the same metallic luster as that of the pigment original not stored for 1 year.

Separation and Pigment Formation Step

The separation, size-reduction and dispersion of the PET film having thereon a stacked body of resin layer-silicon oxide-aluminum-silicon oxide formed above were performed at the same time in ion exchanged water by using an ultrasonic disperser to produce a composite aluminum pigment dispersion.

The produced dispersion was centrifuged under the following conditions by using a centrifugal separator to precipitate and separate the pigment, and the pigment was then naturally dried at normal temperature, whereby a composite aluminum pigment was obtained.

Centrifugal conditions: 10,000 rpm×30 min.

The obtained composite aluminum pigment was formed into a 20 wt % coating solution having the following composition and dropped on a PM/MC photographic paper sheet (Product Number KA420MSH, produced by Seiko Epson Corporation), as a result, it was confirmed that a coating film having silver luster was obtained.

| Composite Aluminum Pigment Coating Solution | |
|---|---|
| Composite aluminum pigment | 20.0 wt % |
| PVA (polyvinyl alcohol, average molecular weight: 10,000, saponification degree: 80%) | 5.0 wt % |
| Ethanol | 10.0 wt % |
| Glycerin | 10.0 wt % |
| Ion exchanged water | balance |

Even after this coating solution was stored for 6 months at normal temperature under atmospheric pressure, a phenomenon such as generation of hydrogen or gelling of coating solution was not observed and the pigment precipitated could be redispersed by stirring for several minutes. Similarly to the above, this coating solution after storage was dropped on a PM/MC photographic paper sheet (Product Number KA420MSH, produced by Seiko Epson Corporation), as a result, it was confirmed that a coating film having silver luster was obtained.

Example 2

Preparation of Substrate Sheet

A resin layer was formed in the same manner as in Example 1.

Formation of Silicon Oxide Layer

On the PET film processed as above, a silicon oxide layer was formed in the same manner as in Example 1.

Formation of Coloring Material Layer

A coating solution for forming a coloring material layer having the following composition was prepared as follows.

A coloring material, a dispersant and ion exchanged water were mixed and then dispersed for 2 hours together with glass beads (diameter: 1.7 mm, in an amount 1.5 times (by weight) the mixture) in a sand mill (manufactured by Yasukawa Seisakusho). Thereafter, glass beads were removed and a coating solution for forming a coloring material layer was obtained.

| | |
|---|---|
| C.I. Pigment Yellow 110 (coloring material) | 15.0 wt % |
| Styrene-acrylic acid copolymer ammonium salt (dispersant, molecular weight: 10,000) | 5.0 wt % |
| Glycerin | 5.0 wt % |
| Ion exchanged water | balance |

The coating solution prepared was coated on the silicon oxide layer by spin coating and dried to form a coloring material layer having a thickness of 150 nm.

Formation of Aluminum Layer

On the coloring material layer, an aluminum vapor-deposited layer having a thickness of 70 nm was formed by using the following apparatus.

Apparatus: vacuum depositing apparatus Model VE-1010 manufactured by Shinkuu Device K.K.

Formation of Coloring Material Layer

On this aluminum layer, a coloring material layer was formed in the same manner as above. The thickness of the coloring material layer formed was similarly 150 nm.

Formation of Silicon Oxide Layer

On this coloring material layer, a silicon oxide layer was formed in the same manner as above. The thickness of the silicon oxide layer formed was 70 nm.

The thus-obtained composite pigment original having such a layer structure had a gold color.

Evaluation of Storage Stability

In order to examine the storability of the PET film (pigment original) having thereon a stacked body of resin layer-silicon oxide-coloring material-aluminum-coloring material-silicon oxide formed above, the pigment original was wound around a paper tube having a diameter of 4 inches and left standing for 1 year in an air in the environment of normal temperature and atmospheric pressure. As a result, even after the passing of 1 year, the pigment original was free from reduction in the surface luster or the like due to oxidation-corrosion. Furthermore, when a coating solution was prepared through the following pigment formation step by using this pigment original after being left standing, the coating film obtained by dropping the coating solution on a PM/MC photographic paper sheet exhibited the same metallic luster as that of the pigment original not stored for 1 year.

Separation and Pigment Formation Step

The separation, size-reduction and dispersion of the PET film having thereon a stacked body of resin layer-silicon oxide-coloring material-aluminum-coloring material-silicon oxide formed above were performed at the same time in ion exchanged water by using an ultrasonic disperser to produce a composite aluminum pigment dispersion.

The produced dispersion was centrifuged under the following conditions by using a centrifugal separator to precipitate and separate the pigment, and the pigment was then naturally dried at normal temperature, whereby a composite aluminum pigment was obtained.

Centrifugal conditions: 10,000 rpm×30 min.

The obtained composite aluminum pigment exhibited a gold color.

This composite aluminum pigment was formed into a 20 wt % coating solution having the following composition and dropped on a PM/MC photographic paper sheet (Product Number KA420MSH, produced by Seiko Epson Corporation), as a result, it was confirmed that a gold coating film was obtained.

| Composite Aluminum Pigment Coating Solution | |
|---|---|
| Composite aluminum pigment | 20.0 wt % |
| PVA (polyvinyl alcohol, average molecular weight: 10,000, saponification degree: 80%) | 5.0 wt % |
| Ethanol | 10.0 wt % |
| Glycerin | 10.0 wt % |
| Ion exchanged water | balance |

Even after this coating solution was stored for 6 months at normal temperature under atmospheric pressure, a phenomenon such as generation of hydrogen or gelling of coating solution was not observed and the pigment precipitated could be redispersed by stirring for several minutes. Similarly to the above, this coating solution after storage was dropped on a PM/MC photographic paper sheet (Product Number KA420MSH, produced by Seiko Epson Corporation), as a result, it was confirmed that a gold coating film was obtained.

Example 3

Aqueous Ink Composition for Inkjet Recording

Solvents and various additives except for a composite aluminum pigment in the blending components shown below were mixed and dissolved to prepare an aqueous dispersion medium for ink, and the composite pigment original obtained in Example 2 was immersed in the prepared aqueous dispersion medium for ink. Then, separation, size-reduction and dispersion of the composite pigment original were performed at the same time by using an ultrasonic disperser to obtain an aqueous ink composition for inkjet recording having a composite pigment content of 15.0 wt %.

Ink Composition 1:

| | |
|---|---|
| Composite aluminum pigment | 15.0 wt % |
| Styrene-acrylic acid copolymer ammonium salt (dispersant, molecular weight: 10,000) | 5.0 wt % |
| Glycerin | 10 wt % |
| Surfynol 465 (nonionic surfactant, produced by Air Product and Chemicals, Inc.) | 1.0 wt % |
| Dipropylene glycol monomethyl ether | 10.0 wt % |
| Triethanolamine | 1.0 wt % |
| HS-500 (sugar alcohol, produced by Hayashibara Biochemical Laboratories, Inc.) | 2.0 wt % |
| Ion exchanged water | balance |

Ink Composition 2:

| | |
|---|---|
| Composite aluminum pigment | 15.0 wt % |
| PVA (polyvinyl alcohol, average molecular weight: 10,000, saponification degree: 80%) | 10.0 wt % |
| Glycerin | 10 wt % |
| Surfynol 465 (nonionic surfactant, produced by Air Product and Chemicals, Inc.) | 1.0 wt % |
| Dipropylene glycol monomethyl ether | 10.0 wt % |
| Triethanolamine | 1.0 wt % |
| HS-500 (sugar alcohol, produced by Hayashibara Biochemical Laboratories, Inc.) | 2.0 wt % |
| Ion exchanged water | balance |

Ink Composition 3:

| | |
|---|---|
| Composite aluminum pigment | 15.0 wt % |
| Styrene-acrylic acid copolymer ammonium salt (dispersant, molecular weight: 10,000) | 5.0 wt % |
| Glycerin | 12 wt % |
| Byk-348 (nonionic surfactant, produced by Byk-Chemie Japan) | 1.0 wt % |
| 1,2-Hexanediol | 10.0 wt % |
| Triethanolamine | 1.0 wt % |
| HS-500 (sugar alcohol, produced by Hayashibara Biochemical Laboratories, Inc.) | 2.0 wt % |
| Ion exchanged water | balance |

Evaluation Test

By using Ink Compositions 1 to 3, printing was performed on a PM/MC photographic paper sheet (semi-gloss) as a recording medium at normal temperature under atmospheric pressure in an inkjet printer EM-930C manufactured by Seiko Epson Corporation. At this time, the printing mode was set to PM-MC photographic paper and recommended setting (fine) mode. After the printing, the printed matter was naturally dried and observed, as a result, it was confirmed that a high-gloss gold coating film was obtained.

Storage Stability

The ink composition using a conventional aluminum pigment can have stability as short as about 6 months even when stored in a cool and dark place in an inert gas atmosphere. On the other hand, the ink composition obtained by the production process of the present invention could be stored for 1 year or more even in an air in the environment of normal temperature and atmospheric pressure.

The composite pigment original of the present invention is a stacked structure body where a metal or metal compound layer and a coloring material layer are surrounded by silicon oxide layers, so that the influence of oxygen and water can be reduced, excellent storage stability unobtainable by conventional techniques can be obtained, and the problem of reactivity with water can be eliminated.

The composite pigment of the present invention separated from the composite pigment original provide effects that when formed into an aqueous inkjet ink composition, the reaction with water can be prevented because the metal or metal compound layer is protected by a silicon oxide layer; even an aqueous medium can be used by virtue of the small specific gravity; and furthermore, since the resin layer plays the roll of protective colloid, the dispersion stability in an aqueous system is enhanced, good adhesion to a recording medium (e.g., paper) is ensured, and recorded matter having high printing quality, excellent storage stability and quick drying property and also excellent in the water resistance, light fastness and glossiness can be obtained.

In the production process of an ink composition of the present invention, a stacked body having a structure comprising a resin layer and a pigment layer sequentially stacked on a sheet-shaped substrate surface, the pigment layer having a structure that a silicon oxide layer, a metal or metal compound layer and a silicon oxide layer are sequentially stacked, is subjected to an ultrasonic treatment in an aqueous dispersion medium for ink and this provides an effect that an ink composition free from the problem of reactivity with water, excellent in dispersion stability, satisfied in the adhesion to a recording medium (e.g., paper) and capable of giving a recorded material having high printing quality, excellent storage stability and quick drying property and also excellent in the water resistance, light fastness and glossiness, which cannot be obtained in conventional techniques, can be easily produced.

While the present invention has been described in detail and with reference to specific embodiments thereof, it will be apparent to one skilled in the art that various changes and modifications can be made therein without departing from the spirit and scope thereof.

The present application is based on Japanese Patent Application Nos. 2003-297887, 2003-297890 and 2003-297894, each filed on Aug. 21, 2003, the contents thereof being herein incorporated by reference.

The invention claimed is:

1. A composite pigment original having a structure comprising at least one resin layer and at least one pigment layer sequentially stacked on a sheet-shaped substrate with the at least one resin layer disposed between the substrate and the at least one pigment layer, the at least one pigment layer having a structure that at least a silicon oxide layer, a metal or alloy layer and a silicon oxide layer are sequentially stacked.

2. The composite pigment original as claimed in claim 1, wherein the thickness of the at least one pigment layer is from 100 to 500 nm.

3. The composite pigment original as claimed in claim 1, wherein the at least one resin layer comprises a polyvinyl alcohol, a polyethylene glycol, a polyacrylic acid, a polyacrylamide or a cellulose derivative.

4. The composite pigment original as claimed in a claim 1, wherein the silicon oxide layer is formed of a silicon alkoxide or a polymer thereof by a sol-gel method.

5. The composite pigment original as claimed in claim 1, wherein the metal or alloy layer is formed by vacuum deposition, ion plating or sputtering.

6. A composite pigment original having a structure comprising a resin layer and a pigment layer sequentially stacked on a sheet-shaped substrate, the pigment layer having a structure that at least a silicon oxide layer, a metal or metal compound layer and a silicon oxide layer are sequentially stacked, wherein the sheet-shaped substrate is a polyethylene terephthalate or a copolymer thereof.

7. The composite pigment original as claimed in claim 1, which has a plurality of pigment layers, including the at least one pigment layer, and a plurality of resin layers, including the at least one resin layer, the plurality of pigment layers and the plurality of resin layers being sequentially stacked to form a stacked structure.

8. The composite pigment original as claimed in claim 7, wherein the stacked structure has an entire thickness of 5,000 nm or less excluding the substrate and the least one resin layer.

9. A composite pigment dispersion obtained by separating the pigment layer of the composite pigment original claimed in claim 1, at the at least one resin layer as a boundary, from the sheet-shaped substrate by immersing the composite pigment original in an aqueous system with formation of a separated pigment layer, and pulverizing the separated pigment layer.

10. The composite pigment dispersion as claimed in claim 9, wherein the pulverization is performed by an ultrasonic treatment.

11. The composite pigment original as claimed in claim 1, wherein the pigment layer has a structure that a silicon oxide layer, a coloring material layer, a metal or metal oxide layer, a coloring material layer and a silicon oxide layer are sequentially stacked.

12. The composite pigment original as claimed in claim 11, wherein the silicon oxide layer or coloring material layer is formed by coating.

13. The composite pigment dispersion as claimed in claim 9, wherein the pigment layer has a structure that a silicon oxide layer, a coloring material layer, a metal or metal oxide layer, a coloring material layer and a silicon oxide layer are sequentially stacked.

14. The composite pigment dispersion as claimed in claim 13, wherein the silicon oxide layer or coloring material layer is formed by coating.

15. A process for producing an ink composition, comprising treating the composite pigment original claimed in claim 1 with an ultrasonic wave in an aqueous dispersion medium for ink.

16. The process for producing an ink composition as claimed in claim 15, wherein the thickness of the pigment layer is from 100 to 500 nm.

17. The process for producing an ink composition as claimed in claim 15, wherein the resin layer comprises a polyvinyl alcohol, a polyethylene glycol, a polyacrylic acid, a polyacrylamide or a cellulose derivative.

18. The process for producing an ink composition as claimed in claim 15, wherein the silicon, oxide layer is formed of a silicon, alkoxide or a polymer thereof by a sol-gel method.

19. The process for producing an ink composition as claimed in claim 15, wherein the metal or metal compound layer is formed by vacuum deposition, ion plating or sputtering.

20. A process for producing an ink composition, comprising providing a composite pigment original having a structure comprising a resin layer and a pigment layer sequentially stacked on a sheet-shaped substrate surface, the pigment layer having a structure that at least a silicon oxide layer, a metal or metal compound layer and a silicon oxide layer are sequentially stacked, and treating the composite pigment original with an ultrasonic wave in an aqueous dispersion medium for ink, wherein the sheet-shaped substrate is a polyethylene terephthalate or a copolymer thereof.

21. The process for producing an ink composition as claimed in claim 15, wherein the composite pigment original has a plurality of pigment layers, including the at least one pigment layer, and a plurality of resin layers, including the at least one resin layer, the plurality of pigment layers and the plurality of resin layers being sequentially stacked to form a stacked structure stacked.

22. The process for producing an ink composition as claimed in claim 21, wherein the stacked structure has an entire thickness of 5,000 nm or less excluding the substrate and the at least one resin layer.

23. The process for producing an ink composition as claimed in claim 15, wherein a coloring material layer is provided between the silicon oxide layer and the metal or alloy.

24. The process for producing an ink composition as claimed in claim 15, wherein the silicon oxide layer or coloring material layer is formed by coating.

25. An ink composition produced by the production process claimed in claim 15.

26. The ink composition as claimed in claim 25, which further contains a polyhydric alcohol lower alkyl ether and/or an acetylene glycol-based surfactant represented by the following formula (1):

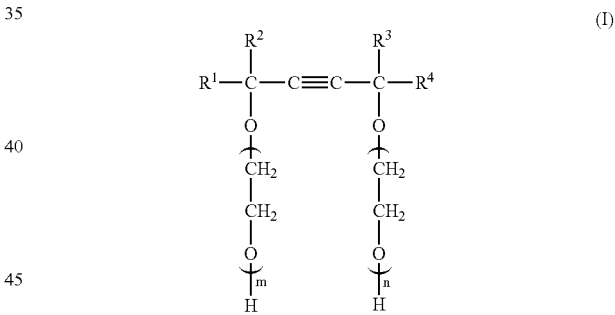

wherein $0 \leq m+n \leq 30$, and $R^1$ to $R^4$ each is independently a $C_{1-6}$ alkyl group.

27. The ink composition as claimed in claim 25, which further contains a 1,2-alkanediol and/or a polyether-modified organosiloxane-based surfactant represented by the following formula (II):

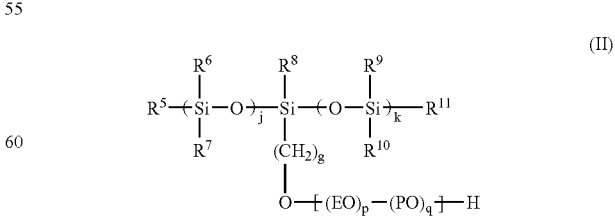

wherein $R^5$ to $R^{11}$ each is independently a $C_{1-6}$ alkyl group, j, k and g each is independently an integer of 1 or more, EO is an ethyleneoxy group, PO is a propyleneoxy group, p and q each is an integer of 0 or more, provided that p+q is an integer of 1 or more, EO and PO are not limited in their order within the square brackets and may be randomly present or may form a block.

28. The composite pigment dispersion as claimed in claim 9, wherein the metal or metal alloy is aluminum.

29. The composite pigment dispersion as claimed in claim 13, wherein the metal or metal alloy is aluminum.

30. A composite aluminum pigment obtained by separating the pulverized, separated pigment layer from the composite pigment dispersion of claim 28.

31. The composite aluminum pigment formed by separating the pulverized, separated pigment layer from the composite pigment dispersion of claim 29.

* * * * *